United States Patent [19]

Sigl

[11] 4,185,188

[45] Jan. 22, 1980

[54] INTERNAL PINION REVOLUTION COUNTER AND METHOD OF ASSEMBLING THE SAME

[75] Inventor: Edward D. Sigl, Bluffton, Ind.

[73] Assignee: Bowmar Instrument Corporation, Ft. Wayne, Ind.

[21] Appl. No.: 946,815

[22] Filed: Sep. 28, 1978

[51] Int. Cl.[2] ........................ G06C 7/10; G01C 22/00

[52] U.S. Cl. ................................ 235/139 A; 235/103

[58] Field of Search .................. 235/103, 136, 117 R, 235/139 A, 139 R

[56] References Cited

U.S. PATENT DOCUMENTS

| | | | |
|---|---|---|---|
| 3,002,687 | 10/1961 | Herr | 235/139 A |
| 3,554,439 | 9/1969 | Sigl | 235/117 R |
| 3,981,441 | 9/1976 | Walters | 235/117 R |

*Primary Examiner*—Donald A. Griffin
*Assistant Examiner*—Benjamin R. Fuller
*Attorney, Agent, or Firm*—Gust, Irish, Jeffers & Rickert

[57] ABSTRACT

An internal pinion revolution counter includes a rotatable input shaft having first and second axial sections, and a bearing sleeve member rotatably supporting the first shaft section. A gear member is rotatably mounted on the sleeve member and has first and second axial sections, the first section having a first full tooth spur gear formed thereon. A first number wheel is secured to the second shaft section for rotation therewith, and an internal pinion transfer mechanism couples the first number wheel to the first spur gear. A second number wheel has a web portion joined to a hub portion mounted on the first spur gear for rotation therewith, and the second section of the gear member has a spur gear segment formed thereon as an extension of the first spur gear. A locking ring has a hub portion mounted on the second section of the gear member, and having an axial slot formed therein with the gear segment extending therethrough, the hub portion of the locking ring having an annular outer locking cam surface. The locking ring has an annular flange portion extending radially outwardly from the hub portion, the flange portion being secured to the web portion of the second number wheel. The gear segment has a portion extending axially beyond the hub portion of the locking ring. A pinion carrier disc is mounted on the sleeve member and has a transfer pinion rotatably mounted thereon, the transfer pinion having first and second axial sections. The first pinion section has a full tooth portion cooperating with the extension portion of the gear segment, and a mutilated portion cooperating with the locking cam surface. A third number wheel is rotatably mounted on the sleeve member and is driven by a second full tooth spur gear which cooperates with the second pinion section.

17 Claims, 14 Drawing Figures

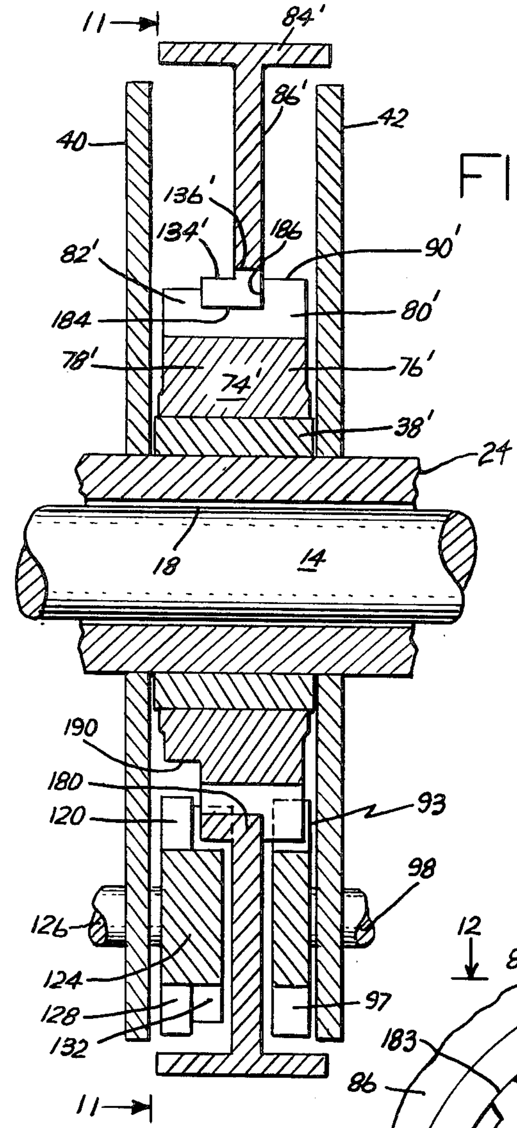
FIG. 10
FIG. 11
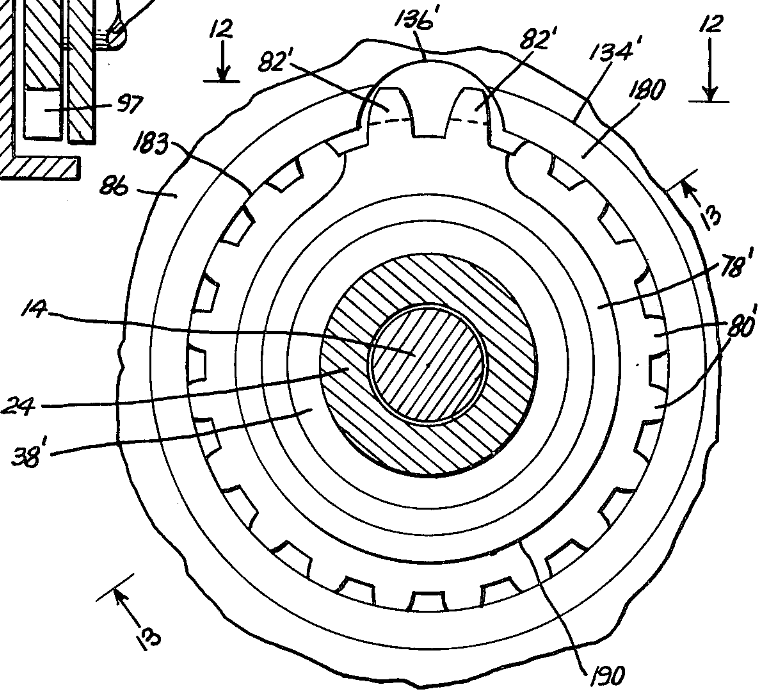

INTERNAL PINION REVOLUTION COUNTER AND METHOD OF ASSEMBLING THE SAME

BACKGROUND OF THE INVENTION

1. Field of the Invention

This invention relates generally to internal pinion revolution counters and methods of assembling the same.

2. Description of the Prior Art

Mechanical revolution counters commonly comprise a plurality of successively higher order number wheels mounted on an input shaft, the revolutions of which are to be counted, the lowest order number wheel being connected to the input shaft and driven directly thereby. Intermittent motion transfer mechanism couples each number wheel to the next higher order number wheel, so that a predetermined number of revolutions of the lower order number wheel rotates the next higher order number wheel by a predetermined incremental amount. A common form of intermittent motion transfer mechanism comprises a segment of a gear rotating with the lower order number wheel, a locking cam which exposes a portion of the gear segment, and a transfer pinion assembly rotatably mounted on a pinion carrier. The transfer pinion includes a full tooth pinion rotated an incremental amount by the gear segment, a mutilated pinion section normally engaging the locking cam to inhibit rotation of the pinion other than at times when the full tooth pinion is rotated by the gear segment, and another full tooth pinion section meshing with the spur gear of the next higher order number wheel. In revolution counters of the internal pinion type, the transfer pinions are disposed within the peripheries of the number wheels.

U.S. Pat. No. 3,002,687 assigned to the assignee of the present application discloses an internal pinion counter wherein each number wheel and the spur gear, locking cam and gear segment associated therewith are retained in assembled relation by a pin, and each pinion carrier is a disc extending between a pair of number wheels and having a portion projecting outwardly from a respective pair of number wheels to be engaged by a portion of the frame of the counter.

There are applications for miniature internal pinion counters and in such miniature constructions, insufficient room is available for the retaining pins and the portion of the frame which engages the pinion carrier disc projections disclosed in the aforesaid U.S. Pat. No. 3,002,687. It is therefore desirable to provide an internal pinion counter construction and method of assembling the same which eliminates the assembly of the number wheels, spur gears, locking cams and gear segments by the use of pins, and the restraint of the pinion carrier discs by the frame, as disclosed in the aforesaid U.S. Pat. No. 3,002,687.

SUMMARY OF THE INVENTION

The invention, in its broader aspects, provides an internal pinion revolution counter which comprises a rotatable input shaft the rotations of which are to be counted and which has first and second axial sections with a bearing sleeve member rotatably supporting the first shaft section. A gear member is rotatably mounted on the sleeve member and has first and second axial sections, the first section of the gear member having a first full tooth spur gear formed thereon. Intermittent motion transfer means drivingly connects the second shaft section to the spur gear. A first number wheel is mounted on the gear member for rotation therewith, and the second section of the gear member has a spur gear segment formed thereon. A locking ring is provided on the first number wheel and has a hub portion on the second section of the gear member, the hub portion having an axial slot formed therein with the gear segment extending therethrough and exposed thereby. The hub portion of the locking ring has an outer annular locking cam surface, and the gear segment has a portion extending axially beyond the hub portion of the locking ring. A pinion carrier is mounted on the sleeve member and a transfer pinion is rotatably mounted on the pinion carrier and has first and second axial sections. The first pinion section has a full tooth portion cooperating with the extension portion of the gear segment and a mutilated portion cooperating with the locking cam surface. A second number wheel is provided rotatably mounted on the sleeve member and driven by a second full tooth spur gear, the second pinion section being full tooth and cooperating with the second spur gear.

In accordance with the method of the invention in its broader aspects, a cylindrical metal blank is provided having opposite ends and a central bore, a full tooth spur gear is formed on a first section of the blank extending from one end, and a spur gear segment is formed on a second section of the blank extending from the other end. A metal number wheel is provided having a web portion and a hub portion, and the hub portion of the number wheel is mounted on the spur gear and is secured thereto. A metal locking ring is provided having a hub portion and an annular flange portion which extends radially outwardly therefrom. An axial slot is formed in the hub portion of the locking ring and the locking ring hub portion is then mounted over the second section of the blank with the gear segment extending through the slot and projecting axially beyond the locking ring hub portion, and the flange portion is secured to the web portion of the number wheel.

It is accordingly an object of the invention to provide and improved internal pinion revolution counter.

Another object of the invention is to provide an improved method of assembling an internal pinion revolution counter.

A further object of the invention is to provide an improved internal pinion revolution counter, particularly suited for miniaturization.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 10 is a fragmentary, side cross-sectional view showing another embodiment of the invention;

FIG. 11 is a fragmentary, cross-sectional view taken generally along the line 11—11 of FIG. 10;

DESCRIPTION OF THE PREFERRED EMBODIMENTS

Figure 1:
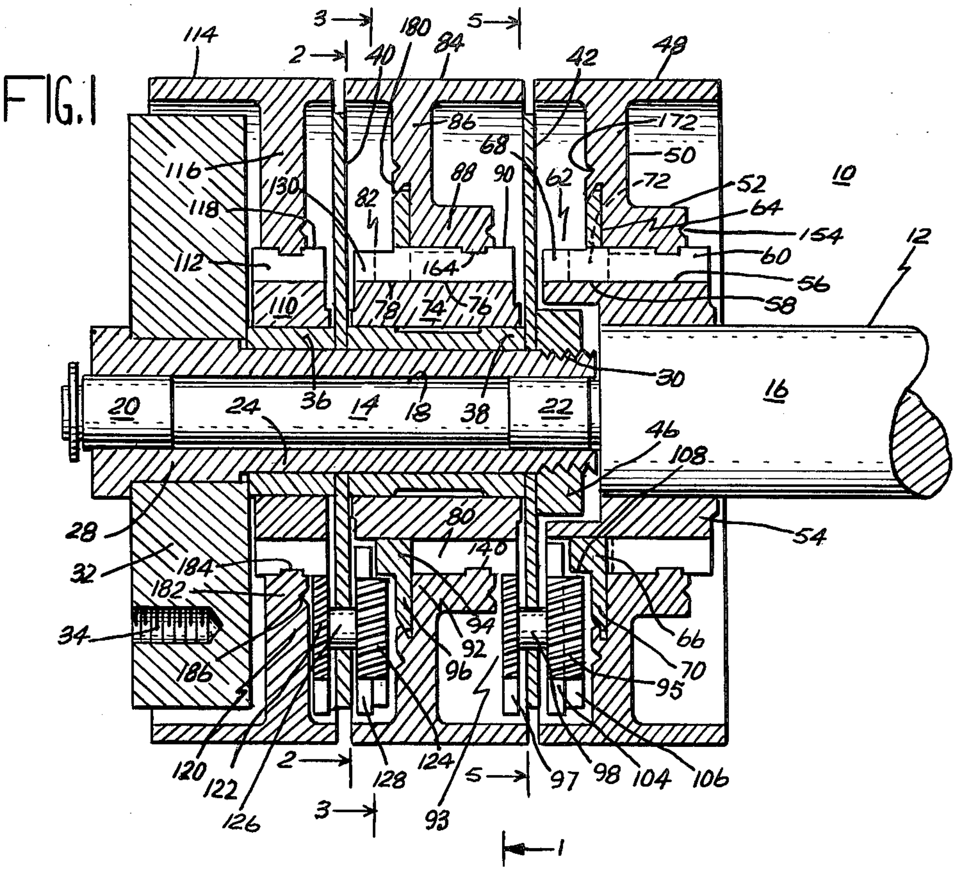
FIG. 1 is a side cross-sectional view showing one embodiment of the improved internal pinion revolution counter construction of the invention.

Referring now to FIGS. 1 through 5 of the drawings, the improved internal pinion revolution counter of one embodiment of the invention, generally indicated at 10, comprises input shaft 12 having journal section 14 and driven section 16. Input shaft section 14 has relieved portion 18 defining journal ends 20, 22.

Input shaft section 14 is rotatably supported by bearing sleeve 24 having flat 26 formed thereon (FIGS. 2 and 5) intermediate ends 28, 30. Mounting member 32 is secured to end 28 of bearing sleeve 24, as by a press fit, and has suitable tapped openings therein, as at 34, for mounting counter 10.

Figure 5:
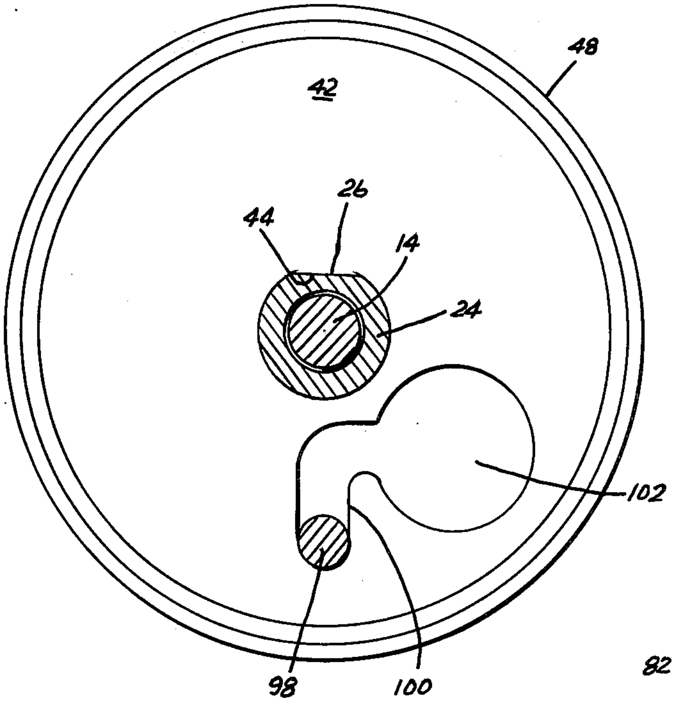
FIG. 5 is a cross-sectional view taken generally along the line 5—5 of FIG. 1.

Spacer sleeves 36, 38 are mounted on bearing sleeve 24 and are axially spaced apart by pinion carrier disc 40 mounted on bearing sleeve 24 and having flat 44 engaging flat 26 in order to prevent rotation thereof. Another pinion carrier disc 42 is mounted on bearing sleeve 24 and likewise is prevented from rotating by flat 44 engaging flat 26 (FIG. 5). Nut 46 threaded on end 30 of bearing sleeve 24 cooperates with member 32 to hold spacers 36, 38, pinion carrier discs 40, 42, and the counter wheel and gear assemblies to be hereinafter described in assembled relation.

Units number wheel 48 is provided having web portion 50 joined to hub portion 52. Gear member 54 is mounted on input shaft section 16 for rotation therewith, as by a press fit, and has axially spaced sections 56, 58, section 56 having full-tooth spur gear 60 formed thereon and part-annular section 58 having two-tooth spur gear segment 62 formed thereon as an extension of spur gear 60. Locking ring disc 64, substantially identical to locking ring disc 92 shown on FIGS. 3 and 4, has hub portion 66 mounted over section 58 of gear member 54 exposing portion 68 of two-tooth gear segment 62 adjacent pinion carrier disc 42, and having radially outwardly extending annular flange portion 70 secured to web portion 50 of number wheel 48, as will hereinafter be described. Hub portion 66 of locking ring disc 64 has cut-out portion 72 therein exposing a further portion of two-tooth gear segment 62. Hub portion 52 of number wheel 48 is secured to spur gear 60 as will hereinafter be described. It will be seen that gear member 54, number wheel 48 and locking ring disc 64 form an assembly which rotates as a unit with input shaft 12.

Gear member 74 is rotatably mounted on spacer 38 and, like gear member 54, has axially spaced sections 76, 78. Full tooth spur gear 80 is formed on section 76 and two-tooth gear segment 82 is formed on part-annular section 78 of gear member 74. Tens number wheel 84 has web portion 86 and hub portion 88 secured to spur gear 80 as will be hereinafter described, and exposing portion 90 thereof adjacent pinion carrier disc 42. Locking ring disc 92 (FIGS. 3 & 4) has hub portion 94 mounted over part-annular section 78 of gear member 74 and radially outwardly extending annular flange portion 96 secured to web portion 86 of number wheel 84 as will be hereinafter described. It will again be seen that gear member 74, number wheel 84 and locking ring disc 92 form an assembly which rotates as a unit.

Transfer pinion 93 has sections 95, 97 connected by shaft portion 98 seated in slot 100 in pinion carrier disc 42 (FIG. 5). Slot 100 communicates with opening 102 which is sufficiently large to permit passing transfer pinion 93 therethrough in order to assemble shaft 98 in slot 100. Section 95 of transfer pinion 93 has eight-tooth portion 104 which cooperates with portion 68 of two-tooth gear segment 62, and mutilated portion 106 in which every other tooth is removed, and which cooperates with annular locking cam surface 108 on hub portion 66 of locking ring disc 64. Full tooth pinion section 97 (which has eight teeth in the illustrated embodiment) cooperates with portion 90 of spur gear 80. Section 95 of transfer pinion 93 is substantially identical to section 124 of transfer pinion 120 shown in FIG. 3 and cooperates with locking cam surface 108 and portion 68 of two-tooth gear 62 in the same way. It will thus be seen that each full revolution of number wheel 48 will result in a 1/10th incremental rotation of number wheel 84.

Gear member 110 is rotatably mounted on spacer 36 and has full tooth spur gear 112 formed thereon. It will be understood that with the two-tooth gear segments 62, 82 and eight-tooth transfer pinions 93, 120, employed in the illustrated embodiment, each spur gear 60, 80, 112 has twenty teeth. Hundreds number wheel 114 has annular web portion 116 secured to spur gear 112, as will be hereinafter described, and exposing portion 118 thereof adjacent pinion carrier 40.

Figure 2:
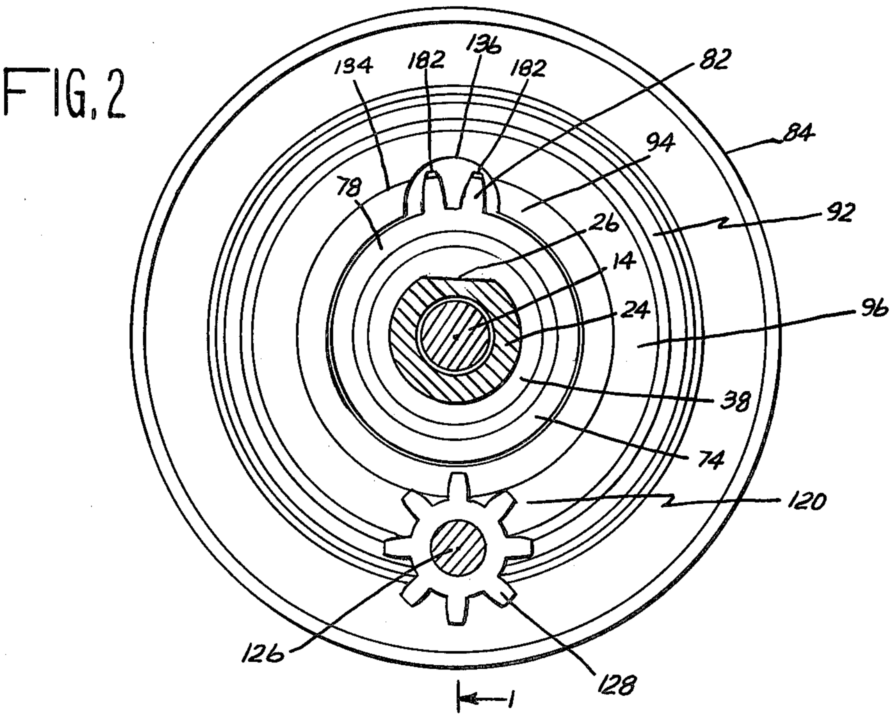
FIG. 2 is a cross-sectional view taken generally along the line 2—2 of FIG. 1.
Figure 3:
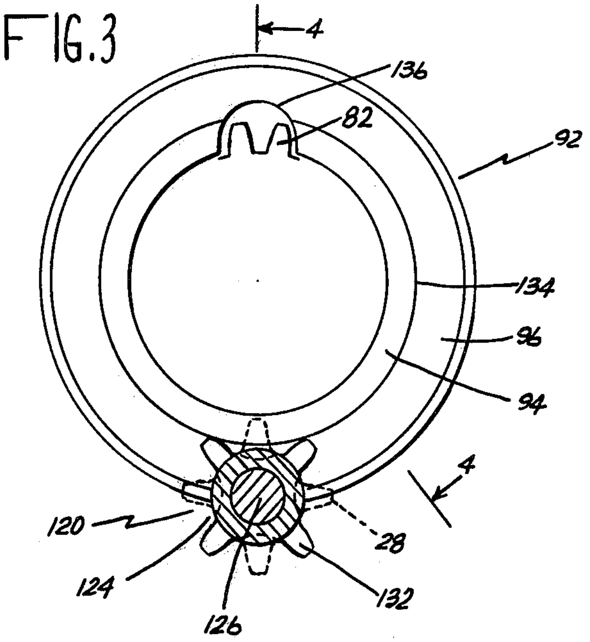
FIG. 3 is a cross-sectional view taken generally along the line 3—3 of FIG. 1.
Figure 4:
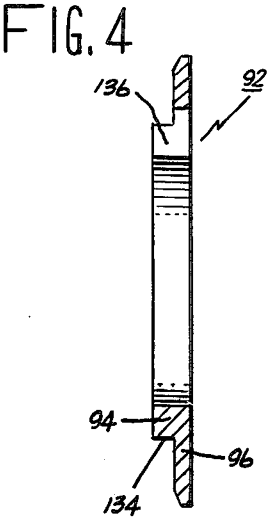
FIG. 4 is a fragmentary cross-sectional view taken generally along the line 4—4 of FIG. 3.

Transfer pinion 120, substantially identical to transfer pinion 93, has full-tooth section 122 and section 124 joined by shaft 126. Shaft 126 is seated in a slot in pinion carrier disc 40 substantially identical to slot 100 in pinion carrier disc 42, as shown in FIG. 5. Section 124 of transfer pinion 120 has eight-tooth section 128 cooperating with portion 130 of two-tooth gear segment 82 adjacent pinion carrier disc 40 exposed by hub portion 94 of locking ring disc 92, and mutilated portion 132 which cooperates with annular surface 134 on hub portion 94 of locking ring disc 92. Hub portion 94 of locking ring disc 92 has semi-circular cut-out portion 136 (FIGS. 2, 3, 4) which exposes two-tooth gear segment 82 (FIG. 2). Eight-tooth section 122 of transfer pinion 120 cooperates with portion 118 of spur gear 112. It will thus be seen that each full revolution of number wheel 84 will result in incremental rotation of number wheel 114 by one-tenth of a revolution.

Figure 6:
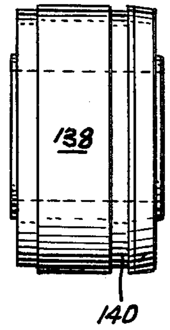
FIG. 6 is a side view of the blank for the gear member of the embodiment of FIGS. 1–5.
Figure 7:
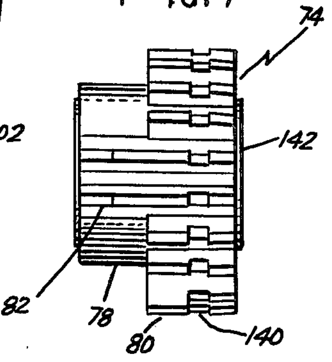
FIG. 7 is a side view of the gear member formed from the blank of FIG. 6.

Referring now additionally to FIGS. 6 through 9 of the drawings, the assembly of number wheels 48, 84 and locking ring discs 64, 92 on gear members 54, 74 is substantially identical and thus the description of the assembly of gear member 74, number wheel 84, and locking ring disc 92 will suffice. Cylindrical blank 138 is provided, having annular groove 140 formed therein (FIG. 6). Full tooth gear 80 is then cut, as by hobbing, on blank 138 from end 142, leaving annular groove 140 exposed, two-tooth gear 82 is cut as an extension of gear 80, and the remaining part of section 78 is machined away to form a part-annular surface, thus forming gear member 74 (FIG. 7).

Figure 8:
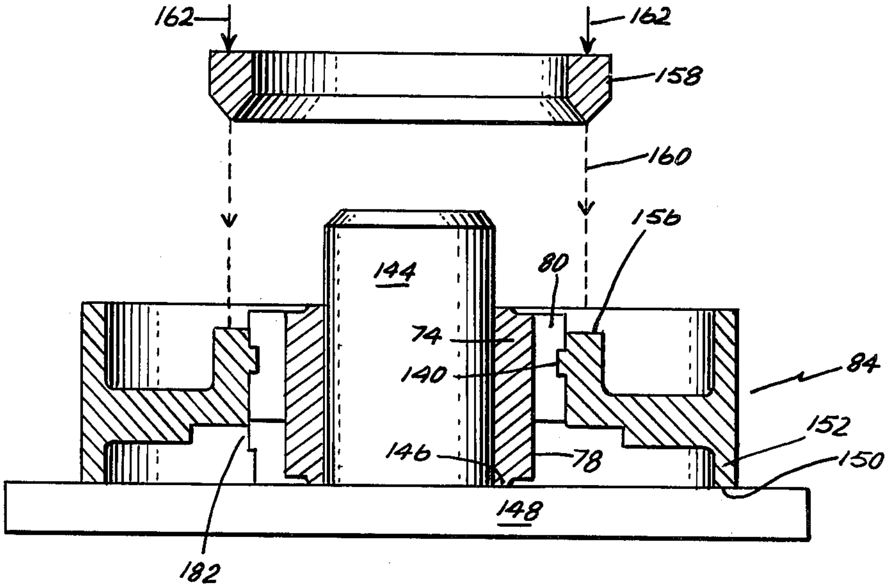
FIG. 8 is a side cross-sectional view showing a step employed in the method of the invention.

Referring now specifically to FIG. 8, gear member 74 is assembled on arbor 144 with its end 146 engaging plate 148. Number wheel 84, which may be formed of suitable metal, such as aluminum, or plastic, has its hub 88 pressed on spur gear 80 until end 150 of flange 152 engages plate 148. Annular staking ring 158 is then located, as indicated in dashed lines at 160 in FIG. 8, and is impacted, as indicated by arrows 162 to stake portion 164 of hub portion 88 in annular groove 140 of spur gear 80 (FIGS. 1 and 9) thereby securing number wheel 84 to gear member 74; V-shaped groove 154 results from the staking operation.

Figure 9:
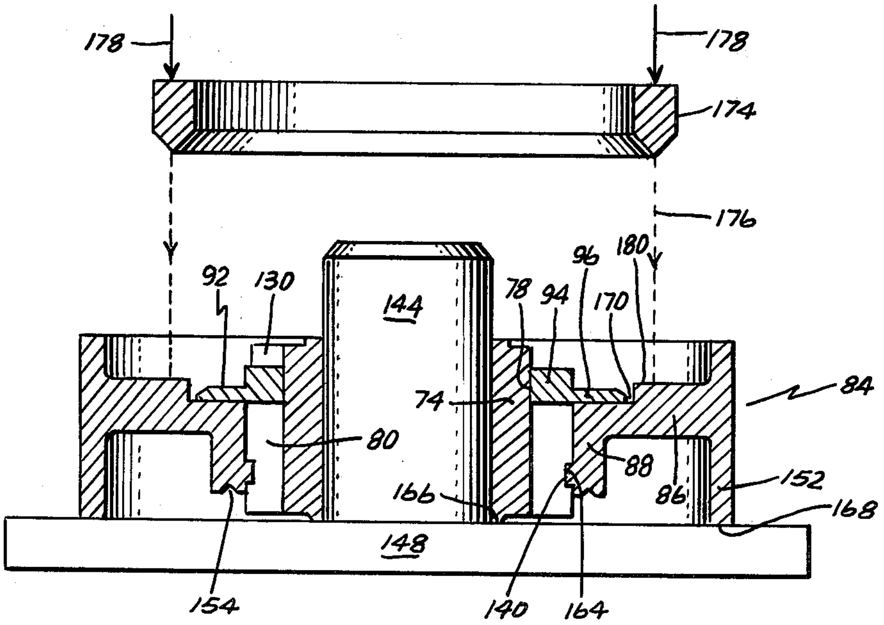
FIG. 9 is a side cross-sectional view showing another step employed in the method of the invention.
Figure 12:
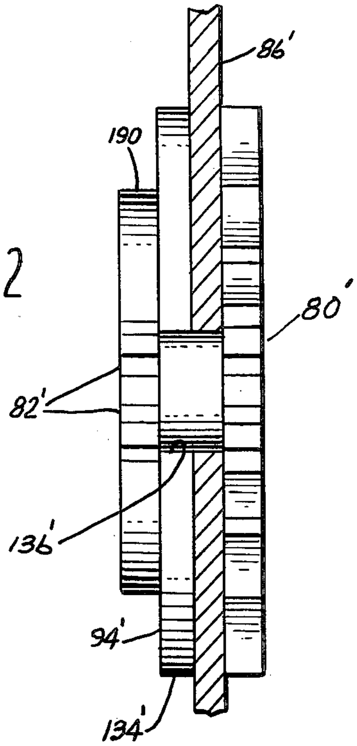
FIG. 12 is a fragmentary, cross-sectional view taken generally along the line 12—12 of FIG. 11.
Figure 13:
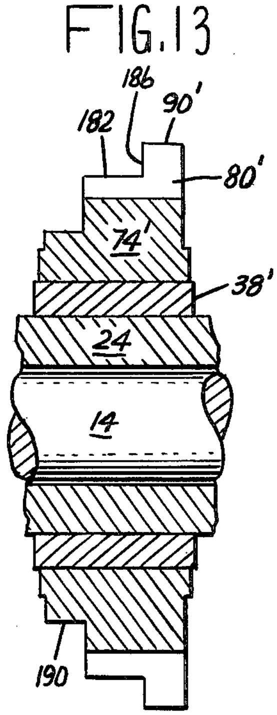
FIG. 13 is a fragmentary, cross-sectional view taken generally along the line 13—13 of FIG. 11.

Referring now to FIG. 9, the thus assembled gear member 74 and number wheel 84 are removed from mandrel 144, reversed and again assembled on mandrel 144 with end 166 of gear member 74 and end 168 of flange 152 of number wheel 84 engaging plate 148. Annular recess 170 was formed in web portion 86 of number wheel 84 during the casting or machining thereof. Hub portion 94 of locking ring disc 92 is assembled over part-annular section 78 of gear member 74 with annular flange portion 96 being seated in annular recess 170, as shown. Annular staking ring 174 is then located, as indicated in dashed lines at 176, and impacted, as indicated by arrows 178, thereby to stake portion 180 of web portion 186 of number wheel 84 over annular flange portion 96 of locking ring disc 92 (FIG. 1); V-shaped groove 172 results from that staking operation. After staking of locking ring disc 92 in annular recess 170 in web portion 86 of number wheel 84 as above described, annular surface 134 of hub portion 94 is machined along with tips 182 of the teeth of two-tooth gear segment 82 so that the same are substantially flush (FIG. 2).

Number wheel 114 is similarly secured to spur gear 112, web portion 116 being initially pressed on spur gear 112, and portion 182 being staked in annular groove 184 by impacting web portion 116 with annular staking tool 158 (FIG. 8).

It will be understood that the transfer pinion and locking cam system of intermittent motion transfer is not my invention, in that other combinations of teeth for the full tooth spur gear, gear segment, and full tooth and mutilated transfer pinion portions may be employed. Further, locking ring discs 64, 92 may be secured to web portions 50, 86 by suitable adhesive (without staking).

Referring now to FIGS. 10–14 in which like elements are indicated by like reference numerals and similar elements by primed reference numerals, a single number wheel and gear assembly for another embodiment of the invention is shown in which the locking ring and number wheel are integral. Here, input shaft 14 has bearing sleeve 24 thereon. Spacer sleeve 38′ is mounted on bearing sleeve 24 with pinion carrier discs 40, 42 on either side thereof. Gear member 74′ is mounted on spacer 38′ and has axially spaced sections 76′, 78′. Full tooth spur gear 80′ is formed on section 76′ and two-tooth segment 82′ is formed on section 78′ of gear member 74′.

The teeth of two-tooth gear segment 82′ are formed as extensions of two teeth of spur gear 80′. In this embodiment, the tips of all of teeth 80′ are cut-off, as at 183, in section 184 between section 76′ and section 78′, as best seen in FIG. 10, thereby defining shoulders 186 on the teeth of full tooth gear 80′.

Number wheel 84′ has web portion 86′ joined to hub portion 180. Hub portion 180 of number wheel 84′ is mounted over ends 182 of the teeth of full tooth gear 80′ and abuts shoulders 186. Semi-circular, axially extending slot 136′ is formed in hub portion 180 and extends into web portion 86′ of number wheel 84′. Slot 136′ is axially aligned with two-tooth segment 82′, as best seen in FIG. 11. Hub portion 180 thus forms the locking ring and its outer surface 134′ forms the locking cam surface to cooperate with mutilated portion 132 of transfer pinion 120. It will be seen that portion 90′ of full tooth gear 80′ is again exposed and that full tooth portion 97 of transfer pinion 93 cooperates therewith. The ends of the teeth of two-tooth gear segment 82′ may be ring-stacked in order to secure number wheel 84′ against lateral movement.

While transfer pinions 93, 120 formed of metal may be used in an embodiment of FIGS. 10–13, in the case of counters intended for highspeed operation, transfer pinions formed of plastic are preferably employed in order to prevent damage to the locking cam surface 134′ of hub portion 180 of number wheel 84′ which, typically, is formed of aluminum.

Figure 14:
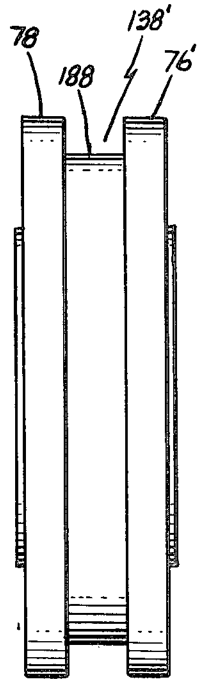
FIG. 14 is a side view of the blank of the gear member of the embodiment of FIGS. 10–13.

Referring now to FIG. 14, gear member 74′ is preferably formed from blank 138′ having section 76′ from which full tooth gear 80′ is formed and section 78′ from which two-tooth gear segment 82′ is formed. Annular groove 188 in blank 138′ between section 76′, 78′ results in the formation of cut-off portions 182 of teeth 80′ and section 184, teeth 80′ being cut or hobbed into groove 188, and section 78′ being milled away radially inwardly from teeth 80′, other than at two-tooth gear segment 82′, to form part-annular surface 190.

It will now be seen that the invention provides an improved internal pinion revolution counter and method of assembly thereof in which the counter wheels and associated gears, locking cams and pinion carriers are held in assembled relation without the use of pins and pinion carrier projections, thus permitting an extremely miniaturized revolution counter construction; in an actual physical embodiment of the internal pinion revolution counter illustrated and described, the outside diameter of the number wheels was 1.0 inch. It will also be seen that the construction of the invention does not require a hub for the counter wheels and that the method of assembly eliminates misalignment and gear pitch line and face runout problems previously encountered.

While there have been described above the principles of this invention in connection with specific apparatus, it is to be clearly understood that this description is made only by way of example and not as a limitation to the scope of the invention.

What is claimed is:

1. An internal pinion revolution counter comprising: a rotatable input shaft the revolutions of which are to be counted and having first and second axial sections; a bearing sleeve member rotatably supporting said first shaft section; a gear member rotatably mounted on said sleeve member and having first and second axial sections, said first section of said gear member having a first full tooth spur gear formed thereon; intermittent motion transfer means for drivingly connecting said second shaft section to said spur gear; a first number wheel mounted on said gear member for rotation therewith; said second section of said gear member having a spur gear segment formed thereon; a locking ring on said first number wheel and having a hub portion on said second section of said gear member; said hub portion having an axial slot formed therein axially aligned with said gear segment, said hub portion of said locking ring having an outer annular locking cam surface, said gear segment extending axially beyond said hub portion of said locking ring; a pinion carrier mounted on said sleeve member; a transfer pinion rotatably mounted on said pinion carrier and having first and second axial sections, said first pinion section having a full tooth portion cooperating with said gear segment and a mutilated portion cooperating with said locking cam surface; and a second number wheel rotatably mounted on said sleeve member and driven by a second full tooth spur gear, said second pinion section being full tooth and cooperating with said second spur gear.

2. The revolution counter of claim 1 further comprising means on said sleeve member for holding said gear member, pinion carrier and second number wheel in assembled relation thereon.

3. The revolution counter of claim 2 wherein said sleeve member has a threaded end adjacent said second shaft section, and further comprising a first spacer on said sleeve member, said gear member being rotatably mounted on said first spacer, a second spacer on said sleeve member, said second spur gear being rotatably mounted on said second spacer, said second number wheel being secured to said second spur gear, said pinion carrier comprising a disc between and abutting said first and second spacers, said first and second pinion sections being respectively on opposite sides of said disc, and an abutment on said sleeve member abutting said second spacer, said holding means comprising a clamping member threaded on said end of said sleeve member and applying force on said first spacer.

4. The revolution counter of claim 1 wherein said gear segment is an extension of said first spur gear and extends axially through said slot, said first wheel having a hub portion secured to said first spur gear, said first spur gear having a portion extending axially beyond said number wheel hub portion, said intermittent motion means being drivingly connected to said first spur gear extension portion.

5. The revolution counter of claim 4 wherein said first spur gear has a circumferential groove formed in the teeth thereof, said hub portion of said first number wheel having a portion secured in said groove.

6. The revolution counter of claim 1 wherein said first number wheel includes a radially extending web portion, said locking ring having an annular flange portion extending radially outwardly from said hub portion, said flange portion being secured to said web portion.

7. The revolution counter of claim 6 wherein said web portion has an annular recess formed therein, said flange portion of said locking ring being secured in said recess.

8. The revolution counter of claims 1 or 3 wherein said gear segment is an extension of said first spur gear and extends axially through said slot, said first number wheel having a radially extending web portion joined to a hub portion mounted on said first spur gear, said first spur gear having a circumferential groove formed in the teeth thereof, said first number wheel hub portion having a portion secured in said circumferential groove, said first spur gear having a portion extending axially beyond said first number wheel hub portion, said intermittent motion means being drivingly connected to said first spur gear extension portion, said locking ring having an annular flange portion extending radially outwardly from said hub portion thereof, said web portion having an annular recess formed therein, said flange portion of said locking ring being secured in said annular recess, said axial slot in said locking ring hub portion being generally semi-circular in cross-section, said locking cam surface of said hub portion of said locking ring being generally flush with the tips of the teeth of said gear segment.

9. The revolution counter of claim 8 wherein said intermittent motion means comprises a second gear member mounted on said second shaft portion and rotatable therewith, said second gear member having first and second axial sections, said first section of said second gear member having a third full tooth spur gear formed thereon, said second section of said second gear member having a second spur gear segment formed thereon as an extension of said third spur gear, said third spur gear having a circumferential groove formed in the teeth thereof, a third number wheel having a web portion joined to a hub portion, said third number wheel hub portion being mounted on said third spur gear and having a portion secured in said circumferential groove therein, said third number wheel web portion having an annular recess formed therein, a second locking ring having a hub portion mounted on said second section of said second gear member, said locking ring hub portion having an axial slot formed therein with said second gear segment extending therethrough and exposed thereby, said slot being semi-circular in cross-section, said hub portion of said second locking ring having an outer annular locking cam surface, said second gear segment having a portion extending axially beyond said second locking ring hub portion, said second locking ring having an annular flange portion extending radially outwardly from said hub portion thereof and secured in said annular recess in said third number wheel web portion, a second pinion carrier disc between and abutting said first spacer and clamping means, and a second transfer pinion rotatably mounted on said second pinion carrier and having first and second axial sections respectively on opposite sides of said second disc, said first section of said second pinion having a full tooth portion cooperating with said extension portion of said second gear segment and a mutilated portion cooperating with said locking cam surface of said second locking ring, said second pinion section being full tooth and cooperating with said first spur gear.

10. The revolution counter of claim 9 wherein said second number wheel includes a web portion, said second spur gear having a circumferential groove formed in the teeth thereof, said web portion of said second number wheel being mounted on said second spur gear and having a portion secured in said circumferential groove thereof.

11. In an internal pinion revolution counter, a number wheel and gear assembly comprising: a gear member adapted to be rotatably mounted on a shaft and having first and second axial sections, said first section having a full-tooth spur gear formed thereon and said second section having a spur gear segment formed thereon, a number wheel secured to said first section of said gear member and rotatable therewith, and a locking ring on said number wheel and having a hub portion mounted over said second section of said gear member, said locking ring hub portion having an axial slot formed therein axially aligned with said gear segment, said locking ring hub portion having an outer annular locking cam surface, a portion of said gear segment extending axially beyond said locking ring portion.

12. The revolution counter of claim 11 wherein said spur gear has a circumferential groove formed in the teeth thereof, said number wheel having a hub portion mounted on said spur gear, said hub portion having a portion secured in said circumferential groove, said spur gear having a portion extending axially beyond said number wheel hub portion.

13. The revolution counter of claim 11 wherein said locking ring has an annular portion extending radially outwardly from said hub portion and secured to said number wheel.

14. The revolution counter of claim 13 wherein said number wheel has a web portion joined to a hub portion, said hub portion being mounted on said first section of said gear member, said web portion having an annular recess formed therein, said annular portion of said locking ring being secured in said annular recess, said locking cam surface being generally flush with the tips of the teeth of said gear segment.

15. The revolution counter of claim 14 wherein said gear segment is an extension of said spur gear and extends axially through said slot, said hub portion of said number wheel being mounted on said spur gear, said spur gear having a circumferential groove formed in the teeth thereof, said hub portion of said number wheel having a portion secured in said circumferential groove, said spur gear having a portion extending axially beyond said hub portion of said number wheel.

16. The revolution counter of claims 1 or 11 wherein said first-named number wheel and locking ring are integral.

17. The revolution counter of claim 16 wherein said first-named number wheel includes a web portion joined to said locking ring hub portion, said slot extending axially through said web portion adjacent said hub portion.

* * * * *